(12) United States Patent
Phillips et al.

(10) Patent No.: US 6,776,369 B2
(45) Date of Patent: Aug. 17, 2004

(54) GLIDING VEHICLE GUIDANCE

(75) Inventors: Craig A. Phillips, King George, VA (US); David S. Malyevac, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/716,977

(22) Filed: Nov. 14, 2003

(65) Prior Publication Data

US 2004/0099769 A1 May 27, 2004

Related U.S. Application Data

(62) Division of application No. 10/175,527, filed on Jun. 21, 2002, now Pat. No. 6,676,071.

(51) Int. Cl.[7] .............................................. F42B 15/01
(52) U.S. Cl. ...................... 244/3.15; 244/3.21; 701/3; 701/1
(58) Field of Search ............................. 244/3.15, 3.13, 244/3.19, 3.22, 3.14, 3.16, 3.17, 3.18, 3.2, 3.21, 194, 195, 76 R, 75 R, 191; 701/1, 3

(56) References Cited

U.S. PATENT DOCUMENTS

| | | | | |
|---|---|---|---|---|
| 2,935,942 A | * | 5/1960 | De Young et al. | 102/384 |
| 3,695,555 A | * | 10/1972 | Chadwick | 244/3.14 |
| 3,984,068 A | * | 10/1976 | McPhee | 244/3.19 |
| 4,008,869 A | * | 2/1977 | Weiss | 244/3.13 |
| 4,651,958 A | * | 3/1987 | Zupanick | 244/191 |
| 4,959,800 A | * | 9/1990 | Woolley | 364/516 |
| 5,071,087 A | * | 12/1991 | Gray | 244/3.15 |
| 5,102,072 A | * | 4/1992 | Egan et al. | 244/195 |
| 5,435,503 A | * | 7/1995 | Johnson, Jr. et al. | 244/3.15 |
| 5,522,567 A | * | 6/1996 | Kinstler | 244/3.15 |
| 5,641,136 A | * | 6/1997 | Skow et al. | 244/191 |
| 5,875,993 A | * | 3/1999 | Weiss et al. | 244/3.22 |
| 5,984,240 A | * | 11/1999 | Shinagawa | 244/195 |
| 6,062,513 A | * | 5/2000 | Lambregts | 244/175 |
| 6,092,919 A | * | 7/2000 | Calise et al. | 700/45 |
| 6,168,117 B1 | * | 1/2001 | Shinagawa | 244/195 |
| 6,244,536 B1 | * | 6/2001 | Cloutier | 244/3.19 |
| H1980 H | * | 8/2001 | Cloutier | 342/62 |
| 6,341,247 B1 | * | 1/2002 | Hreha et al. | 701/3 |
| 6,672,533 B1 | * | 1/2004 | Regebro | 244/3.13 |
| 6,676,071 B1 | * | 1/2004 | Phillips et al. | 244/3.15 |
| 6,724,341 B1 | * | 4/2004 | Pereira et al. | 342/62 |
| 2003/0057331 A1 | * | 3/2003 | Kinkead et al. | 244/194 |
| 2003/0234319 A1 | * | 12/2003 | Phillips et al. | 244/76 R |

* cited by examiner

*Primary Examiner*—Charles T. Jordan
*Assistant Examiner*—Stephen A. Holzen
(74) *Attorney, Agent, or Firm*—Matthew J. Bussan, Esq.; Marguerite O. Dineen, Esq.

(57) ABSTRACT

Guidance of a gliding vehicle is disclosed. A method of the invention allows the range of the glide phase of a gliding vehicle to be maximized, while satisfying final flight path angle and aimpoint requirements. The method controls the time-of-flight of the gliding value to a desired value. The time-of-flight control can correct for winds, off-nominal launch conditions, and rocket motor variations, among other factors. Both time-of-flight control and range and cross-range maximization can be achieved by the inventive method, utilizing a compact closed-loop approach.

13 Claims, 3 Drawing Sheets

GLIDING VEHICLE GUIDANCE

RELATED APPLICATIONS

The present patent application is a divisional of the previously filed and coassigned patent application, entitled "Gliding Vehicle Guidance," filed on Jun. 21, 2002, and assigned Ser. No. 10/175,527 now U.S. Pat. No. 6,676,071.

FIELD OF THE INVENTION

This invention relates generally to gliding vehicles, such as rockets, missiles, aircraft, and projectiles, and more particularly to guiding such gliding vehicle.

BACKGROUND OF THE INVENTION

Atmospheric vehicles that can glide, or that otherwise have significant glide phases, include rockets, missiles, aircrafts, and projectiles. Typically, such vehicles are controllable so that they reach a desired target or destination. They may be controlled by a guidance algorithm. Existing compact closed-form guidance algorithms for gliding flight maximize the range and cross-range while satisfying the aimpoint and final velocity orientation requirements. Compact, closed form algorithms exist to control the time-of-flight of powered vehicles but such algorithms for gliding vehicles have previously been unavailable. To achieve range and cross-range maximization, as well as time-of-flight control for gliding vehicles, open-loop or perturbation feedback algorithms may be utilized. However, such algorithms are expensive to design for a particular application, and are furthermore not robust to airframe and environment variations. For these and other reasons, therefore, there is a need for the present invention.

SUMMARY OF THE INVENTION

The invention relates to guiding a gliding vehicle. A method of the invention allows the range of the glide phase of a gliding vehicle to be maximized, while satisfying final flight path angle and aimpoint requirements. The method may also control the time-of-flight of the gliding value to a desired value, while satisfying final flight path angle and aimpoint requirements. The time-of-flight control can correct for winds, off-nominal launch conditions, and rocket motor variations, among other factors. Both time-of-flight control and range and cross-range maximization can be achieved by the inventive method, utilizing a compact closed-loop approach.

The method provides a unified generic structure that is able to accommodate a wide variety of mission profiles. The method is easily implemented in missile flight hardware in particular, and easily optimized by a designer for a particular application. Because the method is closed loop, it is robust as well. Still other aspects, advantages, and embodiments of the invention will become apparent by reading the detailed description that follows, and by referencing the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. For example, whereas the invention is substantially described in relation to a missile, it is applicable to other types of gliding vehicles as well. The following detailed description is, therefore, not to be taken in a limiting sense, and the scope of the present invention is defined only by the appended claims.

Figure 1:
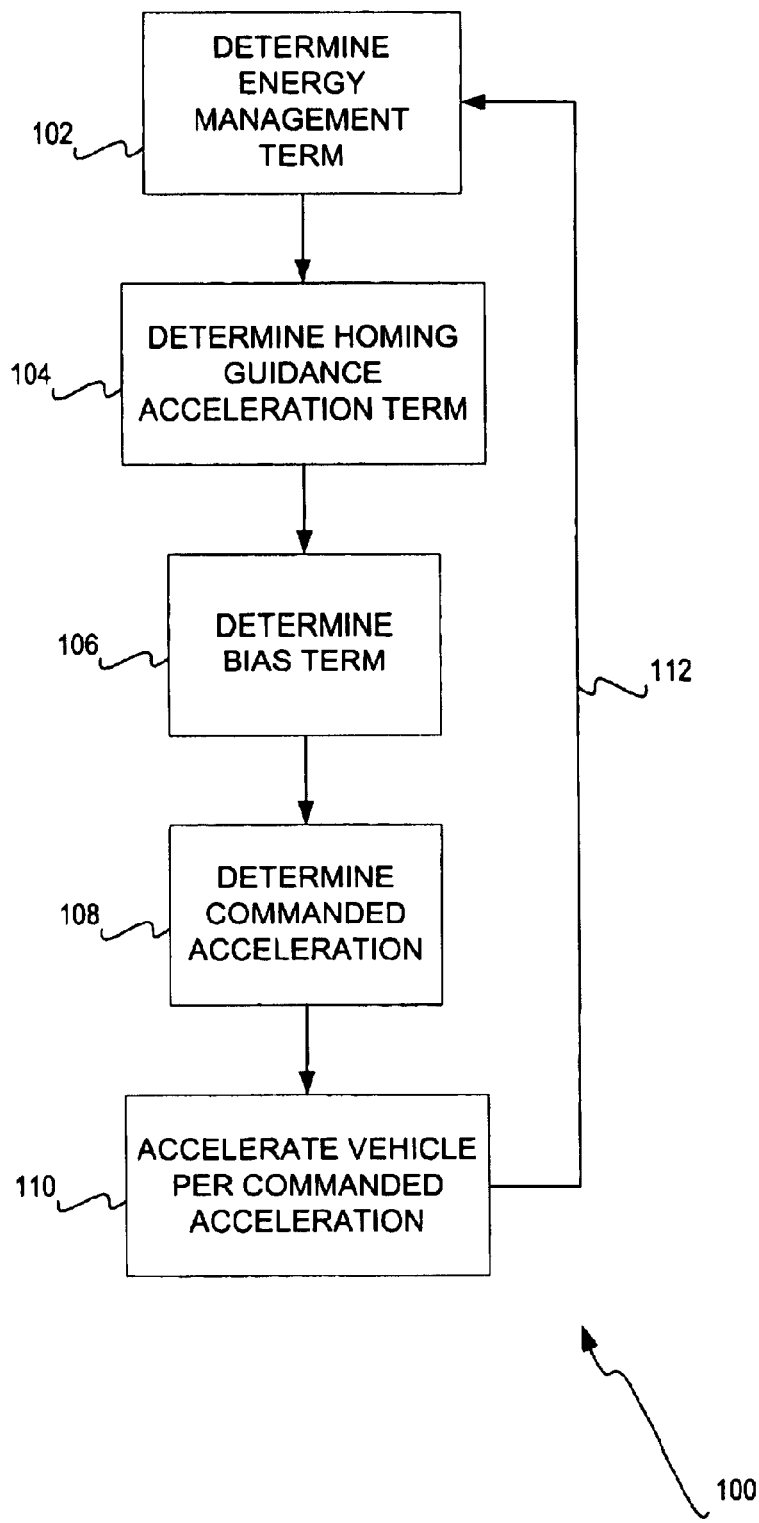
FIG. 1 is a flowchart of a method for guiding a gliding vehicle, according to an embodiment of the invention.

FIG. 1 shows a method 100 for guiding a gliding vehicle, according to an embodiment of the invention. The method 100 may be implemented as a computer program within a controller of the gliding vehicle. The method 100 may also be implemented as a computer program within another type of computer-readable medium, where the various parts of the method 100 constitute corresponding means of the computer program. At least some parts of the method 100 can be performed in an order different than that shown in FIG. 1. For example, parts 102, 104, and 106 are shown as being sequentially performed in a particular order, although the invention is itself not so limited.

The method 100 is activated during the ascent phase of the vehicle, when the flight path angle is greater than the guidance start angle ($\gamma_{GL}$). The guidance achieved by the method 100 shapes the trajectory in a vertical plane defined by the x and z axes of what is referred to as a P frame, to be controlled so as to minimize drag losses and control time-of-flight. The homing commands normal to the x-z plane of the P frame are unrestricted throughout the home phase. The P frame in one embodiment is the Earth local tangent frame at the missile position, the x-axis of which is aligned with the missile's current bearing—i.e., the projection of the missile velocity onto the local tangent plane. The z-axis of the P frame points along the local plumb-bob gravity vector.

An energy management term is determined (102). The energy management term provides for flying the gliding vehicle along an optimal flight path to conserve energy. The energy management term is defined in the P frame, since it represents management of the vertical shaping. In the P frame, the energy management term is given in one embodiment as:

$$\bar{a}_{EM}^P = \begin{Bmatrix} 0 \\ 0 \\ a^* \end{Bmatrix} \quad (1)$$

The scalar a* is determined by a controller that seeks to place the missile at the maximum L/D, subject to the flight path angle follower. The commanded acceleration includes a correction to account for the centrifugal relief associated with the flight over the curved Earth.

$$a^* = f(C_L^*, q, S_{ref}, W, \gamma, \gamma^*) - \frac{(|V_{ECEF}|\cos(\gamma))^2}{R} \quad (2)$$

where γ denotes the current flight path angle relative to the tangent plane having a normal vector that passes through the center of gravity of the missile. The $C_L^*$ is the lift coefficient at maximum lift over drag. q is the dynamic pressure, W is the weight, and γ is the vertical flight path angle in the x-z plane of the P frame. Furthermore, γ* is the optimal vertical flight path angle, $V_{ECEF}$ is the speed of the missile relative to the Earth-centered and Earth-fixed frame, and R represents the radius of curvature of the Earth geo-reference ellipsoid in the direction of travel. Moreover, the value of a* for a flat Earth assumption can be determined according to a variety of different approaches.

Next, a homing guidance acceleration term is determined (104), based on a selected arrival velocity orientation and desired final target coordinates. The homing guidance approach of the method 100 steers the missile to desired final aimpoint coordinates (i.e., final target coordinates), and to a desired final velocity orientation. The homing guidance acceleration is normal to the velocity vector, because the uncontrolled portion along the velocity vector is removed. The azimuth orientation of the final velocity is given by an optimized rule set, based on the current bearing off the line-of-sight to the target. The target may be updated during the flight, and the rule set allows the commanded azimuth angle to be updated to ensure efficient turns.

The homing guidance acceleration term is given in one embodiment as:

$$\bar{a}_{hom R2}^{R1} = \frac{V^2}{RGO}\left[C_1\left(\hat{r}^{R1} - \cos\delta\hat{v}_{R2}^{R1}\right) + C_2\left(\hat{v}_{fR2}^{R1} - \cos\mu\hat{v}_{R2}^{R1}\right)\right] \quad (3)$$

R1 is the (arbitrary) frame in which the commanded acceleration to be determined is expressed, whereas the origin of the R2 frame provides the reference for the definition of the acceleration commands. $C_1$, $C_2$ are gains that may be scheduled for optimization. $\hat{r}$ is the unit vector for the line-of-sight to the target point. δ is the current heading error between the line-of-sight and the current velocity relative to the reference frame R2. $\hat{v}$ is the unit vector along the current velocity relative to the reference frame R2. $\hat{v}_f$ is the unit vector for the desired final velocity orientation relative to the reference frame R2. μ is the angle between the current velocity, relative to the origin of the reference frame R2, and the desired final velocity orientation, also relative to the origin of the reference frame R2. V is the magnitude of the missile velocity relative to the origin of the frame R2.

RGO is the range to go, which is given in one embodiment as:

$$RGO = |r_{t_{R2}}^{R1} - r_{m_{R2}}^{R1}| \quad (4)$$

$r_{m_{R2}}^{R1}$ is the position vector of the missile relative to the origin of the R2 frame, expressed in the R1 frame. $r_{t_{R2}}^{R2}$ is the position vector of the missile relative to the origin of the R2 frame, also expressed in the R1 frame.

The method 100 also determines a bias term (106). The bias term cancels gravity acceleration, and controls time-of-flight of the gliding vehicle. That is, the bias term provides for correction of gravity acceleration, and provides a mechanism for trajectory shaping to control the time-of-flight. The bias is composed of two terms, the first being the bias necessary to correct for acceleration due to gravity, and the second being the bias added for time-of-flight control.

The bias term is defined in one embodiment as:

$$\bar{a}_{bias}^P = \bar{a}_{gbias}^P + \bar{a}_{TOFbias}^P \quad (5)$$

On the right-hand side of the equation, the first term is the bias term to correct for acceleration due to gravity, whereas the second term is the bias term to control time-of-flight. These two terms are themselves expressed in one embodiment as:

$$\bar{a}_{gbias}^P = \begin{Bmatrix} 0 \\ 0 \\ a_{gR2}^P \end{Bmatrix} \quad (6)$$

$$\bar{a}_{TOFbias}^P = \begin{Bmatrix} 0 \\ 0 \\ a_{TOFbias} \end{Bmatrix} \quad (7)$$

$a_{gR2}^P$ is the acceleration relative to the origin of the reference frame R2 due to gravity at the current position, expressed in the P frame. $a_{TOPFbias}$ is the form that the bias term to control time-of-flight.

The time-of-flight bias is determined during the flight by using an in-flight time-of-flight control approach, as can be appreciated by those of ordinary skill within the art. For the in-flight time-of-flight control, the goal is to control the absolute time-of-flight issued by the fire control before launch. The in-flight time-of-flight control corrects for factors unknown at launch. Such factors can include rocket motor variations, drag variations, and unknown winds, among others.

During flight, the value of $a_{TOFbias}$ is desirably updated iteratively with each guidance update, based on the current predicted flight time to the target. The predicted flight time to the target can be based on an onboard simulation of the vehicle trajectories. For each time-of-flight update, the current value of $a_{TOFbiask}$ is used to estimate the current flight time. The difference of this estimate and the commanded time-of-flight is the current time-of-flight error.

$$\Delta t_{errk} = t_{predictk} - t_{command} \quad (8)$$

If the current time-of-flight error and the previous time-of-flight error ($\Delta t_{errk-1}$) have different polarities, then their product will be negative.

$$f_1 = \Delta t_{errk} \Delta t_{errk-1} < 0 \quad (9)$$

In this case, the value of $a_{TOFbias}$ that zeros the time-of-flight error lies between the current value of $a_{TOFbiask}$ and the previous value of the bias, $a_{TOFbiask-1}$. Thus, for the case of $f_1 < 0$, the next value of the bias is given as:

$$a_{TOFbiask+1} = \frac{a_{TOFbiask} + a_{TOFbiask-1}}{2} \quad (10)$$

Conversely, if the value of $f_1 > 0$, then both the current and the previous values of the time-of-flight bias lie on the same side of the value which will zero the time-of-flight error. In this case, the next value of the bias is changed based on the determined error, $\Delta t_{errk}$. Thus, for the case of $f_1 > 0$, the next iteration of the bias acceleration is:

$$a_{TOFbiask+1} a_{TOFbiask} + k_{TOF} \Delta t_{errk} \quad (11)$$

$k_{TOF}$ is a user-selectable gain. The basis for this update approach is that increased positive (i.e., downward) bias decreases the flight time to the target. If the predicted time-of-flight is short ($\Delta t_{errk} < 0$), then the bias is made more negative (i.e., upward) in order to slow the flight.

The method 100 next determines the commanded acceleration for the gliding vehicle (108). This is based on the homing guidance acceleration term, the bias term, and the energy management term that have already been determined. The expression of the commanded acceleration in the R1 frame in one embodiment is given by:

$$\bar{a}_{c_{R2}}{}^{R1} = T_{P2R1}\tilde{K}_{dsm}T_{P2R1}{}^{T}\bar{a}_{hom_{R2}}{}^{R1} + T_{P2R1}\tilde{K}_{dsm}\bar{a}_{bias_{R2}}{}^{P} + T_{P2P1}(1-\tilde{K}_{dsm})a_{em_{R2}}{}^{P} \quad (12)$$

$T_{P2R1}$ is the transformation from the P frame to the R1 reference frame. $\tilde{K}_{dsm}$ is a gain tensor of the form:

$$\begin{bmatrix} K_{dsm} & 0 & 0 \\ 0 & 1 & 0 \\ 0 & 0 & K_{dsm} \end{bmatrix}.$$

The value of the component blending gain scalar $K_{dsm}$ is selected based on the value of the range-to-go (RGO) to the target. The purpose of the gain tensor is to allow the shaping in the vertical plane defined by the x-z axes of the P frame to be controlled, so as to minimize drag losses while allowing the homing commands normal to this plane to be unrestricted throughout the homing phase.

Once the commanded acceleration has been determined, the method 100 then accelerates the vehicle accordingly (110), per the commanded acceleration. That is, the method 100 guides the gliding vehicle based on the commanded acceleration determined. Finally, the method 100 repeats, or iterates, in closed-loop form, as indicated by the arrow 112. For instance, the homing guidance acceleration term may be redetermined as the desired final target coordinates and the commanded azimuth angle are updated. As another example, and as has been previously described, the bias term may be iteratively determined as the time-of-flight of the gliding vehicle changes. Both such changes to the homing guidance acceleration and the bias terms cause the commanded acceleration to be redetermined.

Figure 2:
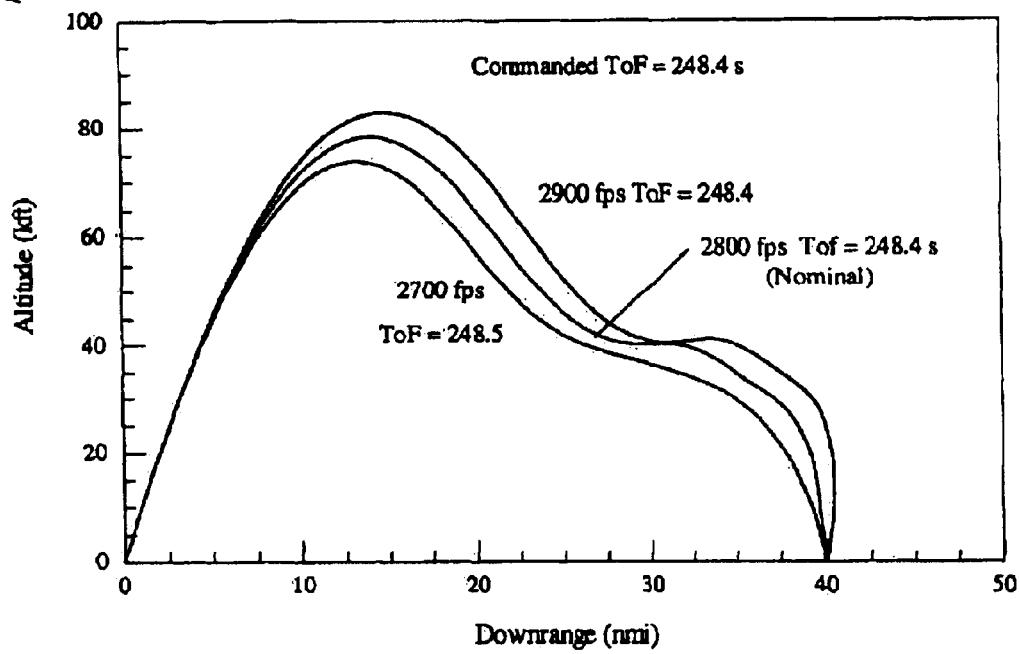
FIG. 2 is a graph illustrating example time-of-flight control trajectories, according to an embodiment of the invention.
Figure 3:
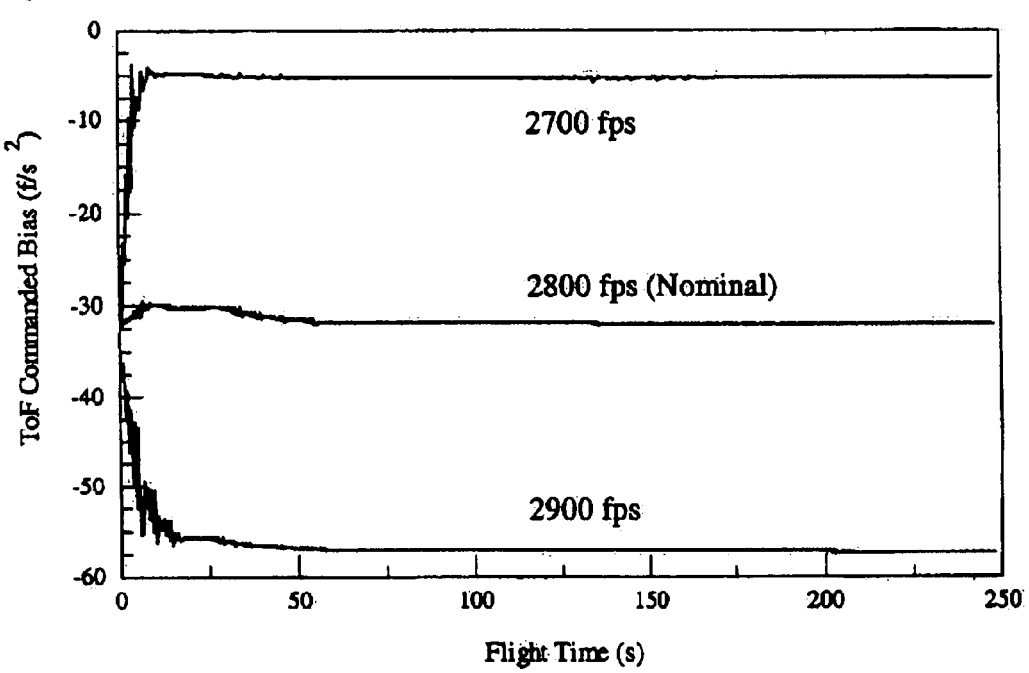
FIG. 3 is a graph illustrating an example time-of-flight bias history, according to an embodiment of the invention.

As an example of the method 100, according to one embodiment of the invention, the performance of an in-flight time-of-flight controller implementing the method 100 is illustrated for an unknown variation of ±100 ft/s in the muzzle exit velocity for a gun-launched guided projectile. FIG. 2 shows a graph 200 of three trajectories with an in-flight time-of-flight controller in accordance with the method 100 active. The fast muzzle exit velocity of 2900 ft/s results in an increase in the bias magnitude and a higher trajectory. The higher trajectory slows the speed of the projectile to correct for the greater initial speed. Furthermore, FIG. 3 shows a graph 300 of the history of the time-of-flight commanded bias for the three trajectories, demonstrating the rapid convergence of the bias and its stability.

Figure 4:
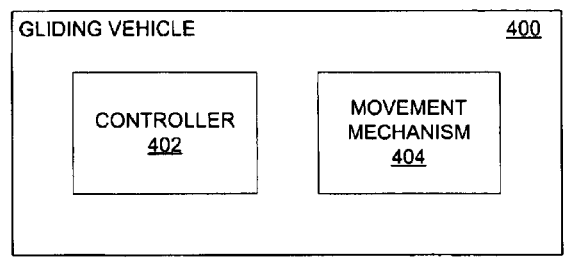
FIG. 4 is a block diagram of a gliding vehicle, according to an embodiment of the invention.

FIG. 4 shows a rudimentary block diagram of a gliding vehicle 400, according to the embodiment of the invention. The gliding vehicle 400 may be a rocket, a missile, an aircraft, a projectile, or another type of gliding vehicle. The gliding vehicle 400 includes a controller 402 and a movement mechanism 404. The controller 402 controls the acceleration of the gliding vehicle 400 in accordance with the method 400 that has been described. The controller 402 accomplishes this by determining a commanded acceleration as has been described—i.e., based on a homing guidance acceleration term, a bias term, and an energy management term. The controller 402 then accordingly accelerates the movement mechanism 404 of the gliding vehicle 400. The movement mechanism 400 may be a rocket, an engine, or another type of mechanism that provides for the accelerated movement of the gliding vehicle 400 through an atmosphere.

It is noted that, although specific embodiments have been illustrated and described herein, it will be appreciated by those of ordinary skill in the art that any arrangement is calculated to achieve the same purpose may be substituted for the specific embodiments shown. For example, other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A computer-readable medium having a computer program to control a gliding vehicle, the computer program comprising:

means for determining a homing guidance acceleration term for the gliding vehicle based on a selected arrival velocity orientation and desired final target coordinates;

means for determining a bias term to cancel gravity acceleration and to control time-of-flight of the gliding vehicle;

means for determining an energy management term to fly the gliding vehicle along an optimal flight path to conserve energy; and, means for determining a composite commanded acceleration for the gliding vehicle based on a component blending gain, the homing guidance acceleration term, the bias term, and the energy management term.

2. The medium of claim 1, further comprising means for gliding the gliding vehicle based on the commanded acceleration determined.

3. The medium of claim 1, wherein the means for determining the homing guidance acceleration term periodically redetermines the homing guidance acceleration term as at least one of the desired final target coordinates and a commanded final velocity orientation are updated, and as vehicle conditions change.

4. The medium of claim 1, wherein the means for determining the homing guidance acceleration term determines the homing guidance acceleration term as normal to a current vehicle velocity orientation.

5. The medium of claim 1, wherein the means for determining the bias term iteratively determines the bias term as a predicted time-of-flight of the gliding vehicle changes.

6. The medium of claim 1, wherein the means for determining the bias term determines a first bias term to cancel the gravity acceleration of the gliding vehicle, and a second bias term to control the time-of-flight of the gliding vehicle.

7. The medium of claim 1, wherein the means for determining the bias term controls the time-of-flight of the gliding vehicle by correcting for factors unknown at launch of the gliding vehicle.

8. The medium of claim 7, wherein the factors unknown at the launch of the gliding vehicle comprise at least one of: rocket motor variations, drag variations, and unknown winds.

9. The medium of claim 1, wherein the means for determining the energy management term periodically redetermines the energy management term as vehicle conditions change.

10. The medium of claim 1, wherein the means for determining the energy management term determines the energy management term relative to an Earth local tangent frame having an x-axis aligned with a current bearing of the gliding vehicle and a z-axis aligned with a local gravity vector.

11. The medium of claim 10, wherein the means for determining the commanded acceleration utilizes a transformation from the Earth local tangent frame to a first desired reference frame, a second desired reference frame providing reference for definition of the commanded acceleration.

12. The medium of claim 1, wherein the means for determining the command acceleration periodically redetermines the commanded acceleration as at least one of the homing guidance acceleration term, the bias term, and the energy management term change.

13. The medium of claim 1, wherein the means for determining the command acceleration determines the commanded acceleration within a desired reference frame.

* * * * *